HIGH FREQUENCY HEATING SYSTEM

Filed Aug. 28, 1962

INVENTORS
Thomas Lamont Wilson
Willard H. Hickok
BY
Atty.

United States Patent Office 3,188,442
Patented June 8, 1965

3,188,442

HIGH FREQUENCY HEATING SYSTEM

Thomas Lamont Wilson, Lyndon, and Willard H. Hickok, Louisville, Ky., assignors to Chemetron Corporation, Chicago, Ill., a corporation of Delaware Filed Aug. 28, 1962, Ser. No. 219,928
6 Claims. (Cl. 219—10.75)

Figures 1, 2:
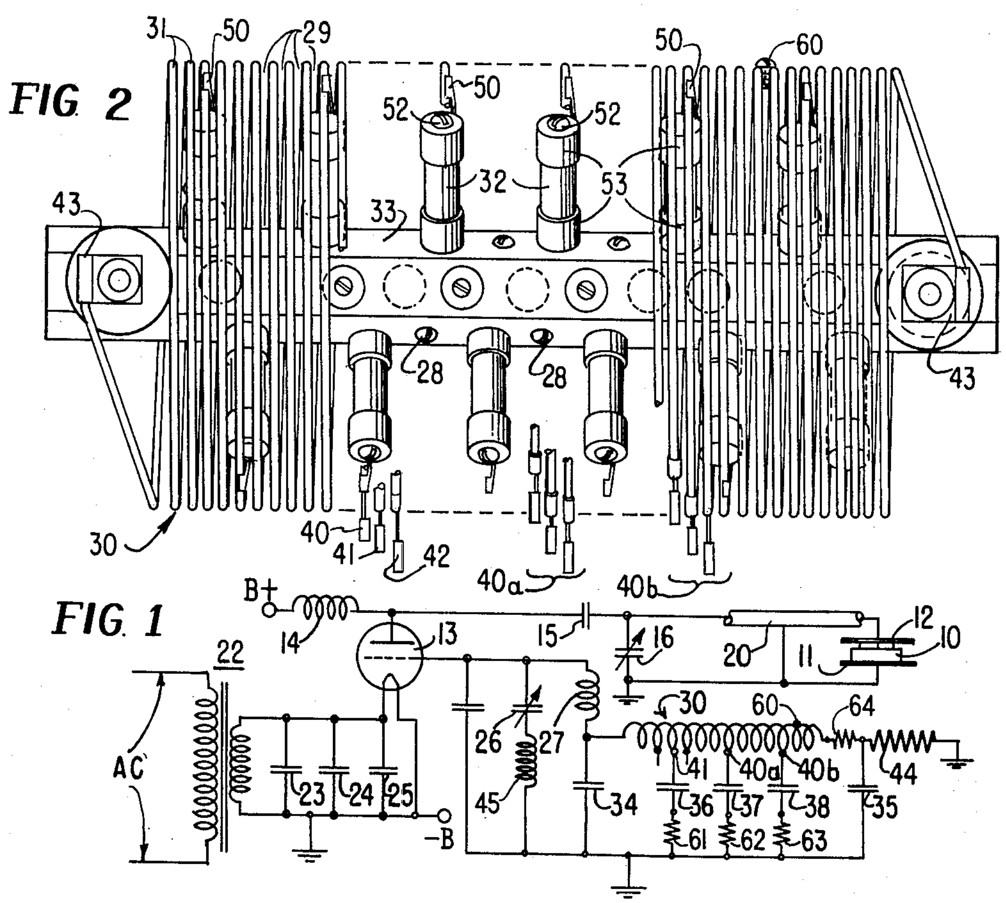

The present invention relates to a high-frequency heating system and more particularly to a high-frequency dielectric heating system employing an oscillator for generating the high-frequency energy.

In the art of building power oscillators, such as are used in high-frequency dielectric heating equipment, difficulties are experienced in the form of parasitic oscillations which are merely oscillations at a frequency other than the desired frequency. In many cases the undesired frequency has the choke coils of the oscillator power tube grid and plate circuits as the main frequency determining elements.

In the past resistors have been used in the grid circuit of the power tube in an attempt to damp out such undesirable low frequency oscillations to an extent that they were not troublesome. However, this has not proven satisfactory in many instances because of inability to obtain resistors of the proper resistance value having the required current-carrying rating.

In considering a different approach to the problem outlined above, it is known that if the frequency of the grid circuit for the oscillator power tube, determined primarily by the stray capacities of the grid circuit in conjunction with inductances such as that of a radio frequency choke coil in the grid circuit, is below the similar frequency for the plate circuit of the oscillator power tube, no oscillation at or near these frequencies will occur. Thus it is desirable to have a large grid choke inductance to keep the oscillator from oscillating at a frequency below the desired frequency.

It is also known in the electronic art that any inductance has its own stray capacitance. Therefore, in a choke coil the stray capacitance will cause resonant frequencies within the choke coil itself. These frequencies can be troublesome, particularly if they are by coincidence of the same frequency as a harmonic of the main desired operating frequency. In these instances, the resonances cause high voltages to appear between nearby parts of the coil, causing arcing within the coil itself. This problem, heretofore, has limited the designer's ability to keep the grid circuit tuned to a frequency below that of the plate circuit.

It is therefore an object of the present invention to provide a high-frequency heating system having improved means for suppressing oscillations at frequencies other than the desired frequency.

Another object of the present invention is to provide a high-frequency heating system having improved means for suppressing oscillations at frequencies other than the desired frequency comprising an induction coil in the grid circuit.

A further object of the invention is to provide in a system as described above means to minimize arcing between coil turns.

Still another object of the invention is to provide in a system as described above means to minimize damage to the coil due to arcing between coil turns.

Briefly stated, in accord with the illustrated embodiment of the present invention, there is provided in the grid circuit of the oscillator power tube means for suppressing oscillations at frequencies other than the desired frequency comprising an induction coil having a plurality of turns of bare wire insulated from each other solely by air space between them, thus minimizing damage to the coil from arcing. Approximately each turn of the coil is supported by an insulator attached to a central support member. The respective insulators provide more electrical insulation between the coil turns via the support member than is provided by the air gap between adjacent turns. Therefore any arcing which occurs will be across the air path between adjacent turns. As the air path will not carbonize due to arcing, little or no damage occurs in the coil due to arcing. The coil structure is also provided with capacitor means for preventing arcing between coil turns even under extreme conditions, for example, when high voltage between turns occurs due to harmonics of the desired oscillating frequency exciting one or more of the several natural high frequency resonances of the choke coil itself. In the illustrated embodiment, capacitors are connected between the ends of the coil and ground, and in addition, capacitors are connected between intermediate spaced portions of the coil and ground. The exact points for connecting the capacitors to intermediate portions of the coil have been found to be rather critical, and the coil may therefore be provided with connectors on adjacent coil turns at the approximate points of arcing so that the connecting points can be adjusted in final test of the complete equipment. The capacitors connected between the turns of the coil and ground de-tunes the natural resonances of the choke coil so that it cannot be excited by a harmonic of the operating frequency, substantially preventing arcing between coil turns.

Figure 3:
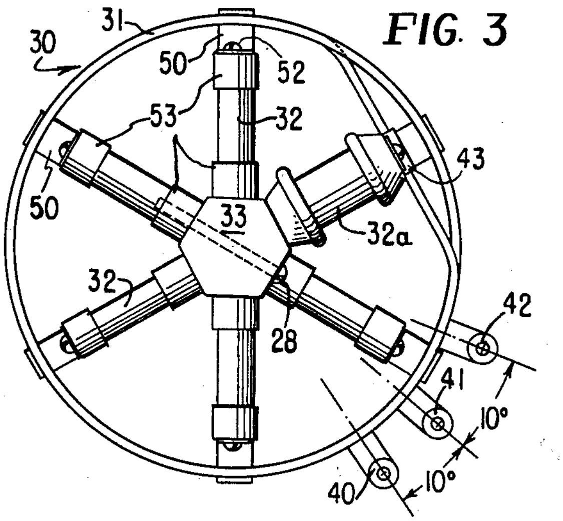

The invention, both as to its organization and method of operation, together with further objects and advantages, will best be understood by reference to the following description taken in connection with accompanying drawing in which:

FIG. 1 diagrammatically shows a dielectric heating system including a coil in the grid circuit in accordance with the invention;

FIG. 2 is a view in elevation partially broken away for clarity showing details of the coil structure; and FIG. 3 is an end view of the coil structure showing details of a central rod support member and insulators supporting the coil turns.

Referring now to the drawing, and particularly to FIG. 1, the invention in one form has been shown as applied to a high frequency heating system utilized for elevating the temperature of a dielectric load or work piece 10 such as a plastic automotive trim panel section, supported on a plate 11. Above the dielectric load 10 is a second plate or electrode 12.

The source of high-frequency power, which may be taken as representative of typical power generators, includes a power tube 13 of the thermionic type having the customary electrodes therein, which has an anode circuit including a source of anode current whose positive and negative terminals have been identified as B+ and B—. A radio frequency choke coil 14 is included in the direct-current anode circuit and the high-frequency output of the tube 13 is fed by way of a coupling capacitor 15 to the load circuit. The load circuit includes a variable capacitor 16 and a coaxial cable section 20. The inductance and capacitance of the illustrated coaxial cable arrangement together with the capacitance between the electrodes 11 and 12 and the capacitance of the variable capacitor 16 form a tuned anode or resonant frequency-determining circuit for the oscillator.

The oscillator tube 13 may be connected to the usual filament transformer 22. Conventional by-pass capacitors 23, 24, and 25 are included in the filament circuit to provide a low impedance path for the high-frequency currents to ground.

The grid circuit includes a grid capacitance 26 of the variable type, a fixed grid coil 45, a suitable R.F. choke coil 27, and a suitable resistor 44. The grid coil 45 and variable capacitor 26 form an inductive circuit at the operating frequency of the system. Although not shown for simplicity, it will be understood that the grid circuit may also include suitable protective devices such as an over-current relay, and suitable switching devices and metering equipment.

In order to suppress parasitic low frequency oscillations at frequencies other than the desired operating frequency, the grid circuit of the present invention is provided with a choke coil 30 shown in FIGS. 1, 2, and 3, comprising in the illustrated embodiment approximately 44 spaced turns of No. 8 bare copper wire. The coil 30 is considerably larger than coil 27, specifically, about 3 times its length and diameter. Such a coil would normally be supported on a form, such as a piece of laminated paper phenolic tubing or other suitable forms, in which there is a surface of insulation between each pair of adjacent turns. This gives the coil adequate mechanical support, but in case of high voltage between turns, the form may be carbonized and thus destroyed, inasmuch as the carbonized path will form a short circuit between turns and will further carbonize due to the current flow through the short circuit. Without a form to support the conventional coil it is impossible to use because of the inherent weakness of such a structure.

Although the coil 30 of the present invention is of relatively large diameter (approximately 7") and small wire size, and therefore mechanically quite flexible, its mode of construction described and illustrated herein minimizes any danger of damage due to arcing between coil turns. As shown in FIGS. 2 and 3, the coil turns 31 of coil 30 are supported in spaced-apart relation by a plurality of ceramic insulators 32 having caps 53 on their ends, which are secured by screws 28 to a central rod 33 which may advantageously be of non-magnetic material such as brass to prevent excessive heating of the rod, and hexagonal in shape to facilitate fastening the insulators 32. The spaced relation of the coil turns 31 provides insulating air gaps 29 between adjacent coil turns. The insulators 32 are connected to the turns 31 by clips 50 which are fastened to the insulators 32 by screws 52 and soldered to the turns 31. In the illustrated embodiment there are less insulators (39) than there are turns of wire (approximately 44). Thus each insulator supports slightly more than one turn of wire. The respective insulators and the clips connecting them to the wire turns are in staggered relation with respect to the insulator and clip connected to the adjacent turn, thus minimizing the possibility of arcing between turns. The end turns of the coil 30 are each provided with insulators 32*a* which are of larger diameter than the insulators 32 to strengthen the coil at each end, and suitable terminals 43. In the illustrated embodiment the insulators 32 and 32*a* provide an electrical creepage distance in excess of one inch between the coil and the rod 33, or in excess of two inches between adjacent turns. The electrical insulating or dielectric strength of this large creepage distance is considerably higher than the electrical insulating strength of the insulating air gap between adjacent turns so that any arcing which occurs will be across the air gap or air path between adjacent turns. As the air path will not carbonize, it is obvious that little or no damage can occur to the coil 30 due to arcing.

In testing a high-frequency heating system including a coil similar to the coil 30, it was found that under certain operating conditions sufficient voltage between turns existed to cause arcing between turns. Studies indicated that these high voltages were due to harmonics of the desired oscillating frequency exciting one or more of the several natural high frequency resonances of the choke coil itself. By experimentation it was developed that a small capacitor, such as 50 mmf., connected between the point at which the arcing occurred and ground, stopped the arcing. In the illustrated embodiment five such capacitors are utilized, namely, capacitors 34 and 35 connected between the ends of the coil 30 and ground, and three capacitors 36, 37, 38 connected between intermediate approximately equally-spaced portions of the coil 30 and ground. The number and location of capacitors required for connection from intermediate portions of the coil to ground may vary with circuit conditions. However, the capacitor 35, connected between the end of coil 30 farthest from the grid of tube 13 and ground, and having a capacity of 500 mmf. vs. only 50 mm. for capacitors 34 and 36–38 as indicated above, is deemed essential for satisfactory results to keep R.F. out of the balance of the circuit.

The exact points of connection for the capacitors on intermediate portions of the coil were found to be critical and therefore groups of adjacent turns near the points of arcing may be fitted with several connectors such as connectors 40, 41 and 42, shown in FIGS. 2 and 3, and connector groups 40*a* and 40*b* shown in FIG. 2, so that the connecting points can be precisely adjusted in a final test of the equipment. The connectors of each group, for example, connectors 40, 41, and 42, are staggered approximately 10° apart (see FIG. 3) to minimize danger of arcing between turns at the connectors. In FIGS. 2 and 3 the coil 30 is shown before connection of the capacitors 34–38 to the ends of the coil and to the connectors at intermediate portions of the coil. After the proper connection point is precisely determined, as indicated above, a capacitor is connected between the connector at that point and ground. For example, in connecting capacitor 36 between coil 30 and ground it will be assumed that the proper connecting point is at connector 41. In such event, capacitor 36 would be connected to connector 41 and ground as shown in FIG. 1, and connectors 40 and 42 would not be used. In similar fashion capacitors 37 and 38 would be connected to the proper connecting points at connector groups 40*a* and 40*b*, respectively.

Experience has shown that connection of the additional capacitance (capacitors 34–38) between the ends and turns of the choke coil 30 and ground, in most instances, sufficiently de-tunes the natural choke resonances of the coil so that it cannot be excited by a harmonic of the operating frequency, thus substantially preventing arcing. However, the coil 30 may have other self-resonances, some of which are harmonically related to the operating frequency and some of which are not, which are not completely damped out by the capacitors 34–38. In these instances one or more screws, such as the screw 60 (FIG. 2) may be used to short adjacent coil turns in conjunction with capacitors such as the capacitors 34–38. Screw 60 is used to short turns at a high voltage point.

In other instances, in order to dampen out all self-resonances, it has been found necessary to add resistors to the circuit such as the resistors 61, 62, and 63, in series with the capacitors 36, 37, and 38, respectively, and a resistor 64 connected to coil 30 between the end of the coil remote from the grid and capacitor 35, as shown in FIG. 1. Screws such as the screw 60, may also be used in the circuit in conjunction with capacitors such as the capacitors 34–38, and resistors such as the resistors 61–64 to dampen out one or more undesirable self-resonances.

In operation, to elevate the temperature of the work piece 10 or other suitable dielectric load, it will be assumed that the electrodes 11 and 12 have their proper spacing and that the setting of the variable capacitor 16 is in proper position for optimum operation of the oscillator at a predetermined frequency which may be in the order of from 1 to 50 megacycles, 10 to 25 megacycles being the usual operation of high-frequency systems of this character. It will be further assumed that the D.C. component of the grid current has the proper value for producing the optimum bias on the grid of the tube 13. This may be accomplished by the proper selection of the value of the resistor 44 and of the initial setting of the capacitor 26. With the oscillator adjusted for optimum efficiency operation, the temperature of the dielectric load 10 will be rapidly increased to the desired temperature. The provision of the choke coil 30 in the grid circuit as described above is effective to suppress any low-frequency oscillations at a frequency other than the desired operating frequency and the provision of the capacitors 34–38 and the shorting screws, and resistors 61–64, where necessary, effectively de-tunes any self-resonance associated with choke coil 30. In the event that there is any arcing between coil turns, little or no permanent damage to the coil 30 can occur as the air gap insulation between coil turns cannot be carbonized.

While there has been described what is at present considered to be the preferred embodiment of the invention, it will be understood that various modifications may be made therein and are intended to be included within the scope of the appended claims.

What is claimed is:

1. In a dielectric heating system comprising an oscillator tube, a tuned anode circuit therefor including plates between which a dielectric load is disposed for heating, and a grid circuit, the combination therewith of an inductance coil in said grid circuit having a plurality of spaced turns of wire insulated from each other by the air gap between them provided by their spacing, ensuring that arcing between coil turns will not cause carbonization of the insulation, a support member for said coil turns, and insulator means extending between said support member and the turns of said coil providing a higher electrical insulation strength between adjacent coil turns than that of the air gaps between them, so that any arcs at said coil will occur across the air gaps between coil turns.

2. In a dielectric heating system comprising an oscillator tube, a tuned anode circuit therefor including plates between which a dielectric load is disposed for heating, and a grid circuit, the combination therewith of means in said grid circuit to suppress undesired low frequency oscillations comprising an induction coil connected in series therewith having a plurality of turns of wire, means to minimize arcing between said coil turns comprising a capacitor connected between a portion of said coil and ground, and means to minimize damage to said coil in the event of any arcing between turns comprising means providing insulation between adjacent coil turns including means for mounting said coil turns in spaced relation with an insulating air gap between adjacent coil turns.

3. In a dielectric heating system comprising an oscillator tube, an anode circuit therefor including plates between which a dielectric load is disposed for heating, and a grid circuit having an R.F. choke coil therein, the combination therewith of means for suppressing low frequency oscillations in said system comprising an induction coil connected in said grid circuit in series with said choke coil, said induction coil having turns of wire supported by a plurality of insulators connected to a central support member, the electrical insulation strength of the insulation between turns via the support member being greater than the insulation strength of the air gap between said turns whereby any arcing between turns will be across the air gap between them, and means to minimize arcing between said induction coil turns comprising a capacitor connected between a portion of said induction coil and ground.

4. In a high frequency dielectric heating system comprising an oscillator tube, an anode circuit therefor including plates between which a dielectric load is disposed for heating, and a grid circuit, the combination therewith of induction means for suppressing undesired low frequency oscillations in said system comprising a choke coil in said grid circuit having a plurality of spaced turns of wire insulated from each other solely by the air gap between them, and means for de-tuning inherent self-resonances in said choke coil comprising a capacitor connected between the end of said coil remote from said grid and ground, and means for connecting at least one other capacitor between ground and a critical connection point on said coil selected from a group of adjacent coil turns at a predetermined intermediate portion of said coil.

5. In a dielectric heating system comprising an oscillator tube, a tuned anode circuit therefor including plates between which a dielectric load is disposed for heating, and a grid circuit having an R.F. choke coil therein, the combination therewith of induction means for suppressing undesirable low frequency oscillations in said system, said induction means comprising an induction coil connected in said grid circuit in series with said R.F. choke coil and having a plurality of turns of wire insulated from each other solely by the air gap between them, capacitor means connected between said choke coil and ground, and means for shorting one or more selected pairs of adjacent coil turns of said induction coil to dampen out one or more undesirable self-resonances of said induction coil.

6. In a dielectric heating system comprising an oscillator tube, a tuned anode circuit therefor including plates between which a dielectric load is disposed for heating, and a grid circuit having an R.F. choke coil therein, the combination therewith of induction means for suppressing undesirable low frequency oscillations in said system by de-tuning the natural coil resonances of the system, said induction means comprising an induction coil having a considerably greater length and diameter than said R.F. choke coil connected in said grid circuit in series relation with said R.F. choke coil, said induction coil having a plurality of turns of wire spaced from each other such that the air gaps between adjacent coil turns provide insulation between them, a capacitor connected between said R.F. choke coil and said induction coil and ground, a serially-connected capacitor and resistor pair connected between an intermediate portion of said induction coil and ground, and a serially-connected resistor capacitor pair connected between the end of said induction coil remote from said grid circuit and ground to dampen out one or more undesirable self-resonances in said coil system.

References Cited by the Examiner

UNITED STATES PATENTS

| | | | |
|---|---|---|---|
| 2,048,723 | 7/36 | Appleton | 331—105 |
| 2,493,044 | 1/50 | Thorne | 331—105 |
| 2,570,311 | 10/51 | Bohnet et al. | 219—10.75 X |
| 2,736,788 | 2/56 | Nack et al. | 219—10.75 |

FOREIGN PATENTS

| | | |
|---|---|---|
| 199,894 | 7/23 | Great Britain. |

RICHARD M. WOOD, *Primary Examiner.*